(12) United States Patent
China

(10) Patent No.: US 11,021,669 B2
(45) Date of Patent: Jun. 1, 2021

(54) USE OF BIODEGRADABLE HYDROCARBON FLUIDS IN ELECTRIC VEHICLES

(71) Applicant: TOTAL MARKETING SERVICES, Puteaux (FR)

(72) Inventor: Philippe China, Seyssuel (FR)

(73) Assignee: TOTAL MARKETING SERVICES, Puteaux (FR)

( * ) Notice: Subject to any disclaimer, the term of this patent is extended or adjusted under 35 U.S.C. 154(b) by 24 days.

(21) Appl. No.: 16/344,880

(22) PCT Filed: Oct. 26, 2017

(86) PCT No.: PCT/EP2017/077460
§ 371 (c)(1),
(2) Date: Apr. 25, 2019

(87) PCT Pub. No.: WO2018/078024
PCT Pub. Date: May 3, 2018

(65) Prior Publication Data
US 2019/0264121 A1    Aug. 29, 2019

(30) Foreign Application Priority Data

Oct. 27, 2016   (EP) ..................................... 16196121

(51) Int. Cl.
*C10M 101/02*   (2006.01)
*B60K 11/02*    (2006.01)
(Continued)

(52) U.S. Cl.
CPC ........... *C10M 101/02* (2013.01); *B60K 11/02* (2013.01); *C10M 105/04* (2013.01);
(Continued)

(58) Field of Classification Search
CPC .............. C10M 101/02; C10M 105/04; C10M 2203/022; C10M 2205/173;
(Continued)

(56) References Cited

U.S. PATENT DOCUMENTS 4,078,010 A * 3/1978 Prillieux .............. C10M 143/00
585/255
4,125,566 A   11/1978 Trin Dinh et al.
(Continued)

FOREIGN PATENT DOCUMENTS

CN   105087113      11/2015
CN   105087113 A  * 11/2015
(Continued)

OTHER PUBLICATIONS

Database WPI Week 200949, Derwent World Patents Index; AN 2009-L73794, XP002765048 * & JP2009161604 A Jul. 23, 2009 (Nippon Oil Co LTD) [I] 1-19 * abstract *.
(Continued)

*Primary Examiner* — Taiwo Oladapo
(74) *Attorney, Agent, or Firm* — Duane Morris LLP; Gregory M. Lefkowitz; Brandon A. Chen

(57) ABSTRACT

The invention is the use, in an electric vehicle, of a fluid having a boiling point in the range of from 200° C. to 400° C. and a boiling range below 80° C., said fluid comprising more than 95% by weight isoparaffins and less than 3% by weight of naphthens, a biocarbon content of at least 95% by weight, containing less than 100 ppm by weight aromatics.

15 Claims, 2 Drawing Sheets

(51) Int. Cl.
*H01M 10/625* (2014.01)
*H01M 10/6567* (2014.01)
*C10M 105/04* (2006.01)
*H01M 10/613* (2014.01)
*C10N 20/02* (2006.01)
*C10N 20/00* (2006.01)
*C10N 30/00* (2006.01)
*C10N 40/02* (2006.01)
*C10N 40/04* (2006.01)
*C10N 40/14* (2006.01)
*C10N 40/16* (2006.01)
*C10N 40/00* (2006.01)
*C10N 70/00* (2006.01)

(52) U.S. Cl.
CPC ....... *H01M 10/613* (2015.04); *H01M 10/625* (2015.04); *H01M 10/6567* (2015.04); *C10M 2203/022* (2013.01); *C10M 2203/1025* (2013.01); *C10M 2203/1065* (2013.01); *C10M 2205/173* (2013.01); *C10M 2207/401* (2013.01); *C10N 2020/015* (2020.05); *C10N 2020/02* (2013.01); *C10N 2020/071* (2020.05); *C10N 2020/075* (2020.05); *C10N 2020/081* (2020.05); *C10N 2030/40* (2020.05); *C10N 2030/43* (2020.05); *C10N 2030/64* (2020.05); *C10N 2040/02* (2013.01); *C10N 2040/04* (2013.01); *C10N 2040/14* (2013.01); *C10N 2040/16* (2013.01); *C10N 2040/17* (2020.05); *C10N 2040/40* (2020.05); *C10N 2070/00* (2013.01); *H01M 2220/20* (2013.01)

(58) Field of Classification Search
CPC .... C10M 2207/401; C10M 2203/1025; C10M 2203/1065; H01M 10/625; H01M 10/6567; H01M 10/613; H01M 2220/20; B60K 11/02; C10N 2020/02; C10N 2020/015; C10N 2020/071; C10N 2020/075; C10N 2020/081; C10N 2030/40; C10N 2030/43; C10N 2030/64; C10N 2040/02; C10N 2040/04; C10N 2040/14; C10N 2040/16; C10N 2040/17; C10N 2040/40; C10N 2070/00; Y02E 60/10; Y02T 10/70

See application file for complete search history.

(56) References Cited

U.S. PATENT DOCUMENTS

| | | |
|---|---|---|
| 4,385,193 A | 5/1983 | Bijwaard et al. |
| 4,478,955 A | 10/1984 | Pesa et al. |
| 4,594,468 A | 6/1986 | Minderhoud et al. |
| 4,943,672 A | 7/1990 | Hamner et al. |
| 5,059,299 A | 10/1991 | Cody et al. |
| 6,090,989 A | 7/2000 | Trewella et al. |
| 6,130,184 A | 10/2000 | Geerlings et al. |
| 8,608,812 B2 | 12/2013 | Perego |
| 9,845,432 B2 | 12/2017 | Rispoli et al. |
| 2006/0264684 A1 | 11/2006 | Petri et al. |

FOREIGN PATENT DOCUMENTS

| | | |
|---|---|---|
| EP | 0583836 | 2/1994 |
| EP | 0668342 | 8/1995 |
| EP | 0776959 | 6/1997 |
| EP | 2368967 | 9/2011 |
| EP | 2520637 | 11/2012 |
| JP | 2009161604 | 7/2009 |
| JP | 2012017391 | 1/2012 |
| JP | 2012184360 | 9/2012 |

OTHER PUBLICATIONS

Database WPI Week 201209, Derwent World Patents Index; AN 2012-B18885, XP002765049 * & JP2012017391 A Jan. 26, 2012 (Idemitsu Kosan Co LTD) [A] 1-19 * abstract *.

Database WPI Week 201623, Derwent World Patents Index; AN 2015-79379Y, XP002765050 * & CN105087113 A Nov. 25, 2015 (Petrochina Co LTD) [A] 1-19 * abstract *.

* cited by examiner

USE OF BIODEGRADABLE HYDROCARBON FLUIDS IN ELECTRIC VEHICLES

CROSS-REFERENCE TO RELATED APPLICATIONS

This application is a § 371 national stage entry of International Application No. PCT/EP2017/077460, filed Oct. 26, 2017, which claims priority to European Application No. 16196121.4, filed Oct. 27, 2016, the entire contents of which are incorporated herein by reference.

FIELD OF THE INVENTION

The invention relates to the use of specific biodegradable fluids for cooling and/or lubricating the motor of an electric vehicle as well as the different parts especially the moving ones. The invention also relates to the use for lubricating these parts as well as the transmission of the vehicle.

The invention also applies to the battery.

The invention applies to electric vehicles and to hybrid vehicles.

BACKGROUND ART

International standards concerning $CO_2$ emissions reduction, but also concerning the fuel efficiency of automotive engines encourage automotive constructors to develop alternative solutions to combustion engines.

Researches for reducing $CO_2$ emission lead to the development of hybrid and electric vehicles by many automotive companies. By "electric vehicle" according to the present invention it is meant a vehicle comprising an electric motor as unique propulsion mode. By "hybrid vehicle" according to the present invention it is meant a vehicle comprising an electric motor in combination with another power source as propulsion mode. By "electric motor of a vehicle" according to the present invention it is meant the electric motor of an electric vehicle or of a hybrid vehicle.

Electric motors generate heat when operated. If the amount of generated heat is greater than what is naturally dissipated to the environment, some form of active cooling is needed. Typically, the active cooling is applied to one or more heat-generating parts of the motor, and/or the heat-sensitive part(s), so that unsafe temperatures are avoided.

Traditionally, it is known to cool electric motors by air, generally by forced convection. The air-cooling method advantageously does not require any specific coolant to be prepared. However, air is unlikely to provide a large cooling capacity, in particular regarding the downsizing of motors having higher power efficiency, rendering this cooling method unsuitable.

Nowadays it is also known to use water in order to cool electric motors. While water exhibits a high specific heat, it is not possible to consider cooling by direct contact with water because of the electrical conductivity of water. Hence, a cooling pipe has to be laid out, which disadvantageously increases the size of the cooling device.

Cooling methods of electric motors using an oil spray have also already been suggested.

For electric cars, compared to hybrid ones, there is a specific requirement for an oil with improved cooling properties since motors of electric cars are subject to more solicitations.

The electric motor is supplied by a battery. Li-ion batteries are the most common batteries in the domain of electric vehicles. The downsizing of batteries with same or improved efficiency leads to heat management problems. When the temperature of a Li-ion battery is too high there is a risk of igniting the battery or even a risk of explosion. On the other hand, when the temperature becomes too low there is a risk of unloading the battery prematurely.

EP2520637 describes a lubricating composition comprising at least an ester or an ether for cooling an electric motor and lubricating the gears in a vehicle. However, it is known that esters are not stable to oxidation. Moreover, esters raise compatibility problems with varnishes and joints which cause their deterioration. In particular, the winding in an electric motor is coated with a varnish. As the cooling fluid is directly in contact with the winding, it is essential that the fluid is inert regarding this varnish.

JP2012/184360 describes a lubricating composition comprising at least one synthetic base oil and a fluorine compound for cooling an electric motor. However, fluorine compounds such as hydrochlorofluorocarbons are organic gases having a negative impact on the ozone layer and they are also greenhouse gases with a much higher potential to enhance the greenhouse effect than $CO_2$. Therefore, these compounds are subjected to several regulations which strongly limit their use.

None of the solutions of the prior art provides a biodegradable fluid for cooling and/or lubricating electric motors. Therefore, there is a need to provide a fluid that allows to cool and/or to lubricate the electric motor of a vehicle and which overcome the disadvantages of the prior art.

An objective of the present invention is therefore to provide a fluid for cooling and/or lubricating the electric motor of a vehicle.

Particularly, an objective of present invention is to provide a fluid for cooling the power electronic parts and/or the stator and/or the rotor and for lubricating the reducer of the electric motor of a vehicle.

Yet another objective of present invention is to provide a fluid for cooling the battery of an electric vehicle.

SUMMARY OF THE INVENTION

The invention provides the use, in an electric or a hybrid vehicle, of a fluid having a boiling point in the range of from 200° C. to 400° C. and a boiling range below 80° C., said fluid comprising more than 95% isoparaffins and less than 3% of naphthens by weight, a biocarbon content of at least 95% by weight, containing less than 100 ppm aromatics by weight.

As well understood by the skilled person, a boiling range below 80° C. means that the difference between the final boiling point and the initial boiling point is less than 80° C.

According to an embodiment, the use of the invention is in an electric vehicle.

According to various embodiments, the invention relates to the following uses:
  for cooling the motor.
  for cooling the power electronics and/or the rotor and/or the stator of the motor.
  for cooling the battery.
  for lubricating the motor.
  for lubricating bearings between rotor and stator and/or the reducer of the motor.
  for lubricating the transmission.
  for cooling and lubricating the motor.
  for cooling the motor and for lubricating the transmission.

According to one embodiment, the fluid has a boiling point in the range of from 220° C. to 340° C., preferably 250° C. to 340° C.

According to one embodiment, the boiling range is 240° C.-275° C. or 250° C.-295° C. or 285° C.-335° C.

According to one embodiment, the fluid is obtainable by the process comprising the step of catalytically hydrogenating a feed comprising more than 95% by weight of a hydrodeoxygenated isomerized hydrocarbon biomass feedstock or a feed comprising more than 95% by weight of a feedstock originating from syngas, at a temperature from 80 to 180° C., at a pressure from 50 to 160 bars, a liquid hourly space velocity of 0.2 to 5 $hr^{-1}$ and an hydrogen treat rate up to 200 $Nm^3$/ton of feed; preferably the feed comprises more than 98%, preferably more than 99% of a hydrodeoxygenated isomerized hydrocarbon biomass feedstock, and more preferably consists of a hydrodeoxygenated isomerized hydrocarbon biomass feedstock, and especially where the biomass is a vegetable oil, an ester thereof or a triglyceride thereof, the feed being more preferably a HVO feed, especially NEXBTL, or wherein the feed comprises more than 98%, preferably more than 99% of a feedstock originating from syngas, more preferably from renewable syngas.

According to one variant, in the previous embodiment, a fractionating step is carried out before the hydrogenating step, or after the hydrogenating step or both.

According to one embodiment, the fluid contains less than 50 ppm aromatics, and preferably less than 20 ppm by weight.

According to one embodiment, the fluid contains less than 1% by weight of naphthens by weight, preferably less than 500 ppm and advantageously less than 50 ppm.

According to one embodiment, the fluid contains less than 5 ppm, even less than 3 ppm and preferably less than 0.5 ppm sulphur.

According to one embodiment, the fluid has a biodegradability at 28 days of at least 60%, preferably at least 70%, more preferably at least 75% and advantageously at least 80%, as measured according to the OECD 306 standard.

The improved fluids due to their dual properties of cooling and lubricating will find different uses at many locations in an electric vehicle, especially a car. The vehicle, especially car, can be fully electric or hybrid.

In use the improved fluids of the invention can also comprise any additive known in the art as will be disclosed below.

The improved fluid according to the invention can be used for cooling by any method known in the art. As examples of cooling method one can cooling by direct spraying under pressure or by spraying by gravity or by forming a mist from the improved fluids, especially on the winding of the rotor and/or stator.

The improved fluids provide health and environment benefits. The improved fluids also provide lower risks of deterioration of seals and varnishes present in the motor, and allows avoiding any contact between water and the motor or parts thereof, such as the windings.

DESCRIPTION OF EMBODIMENTS OF THE INVENTION

Figure 1:
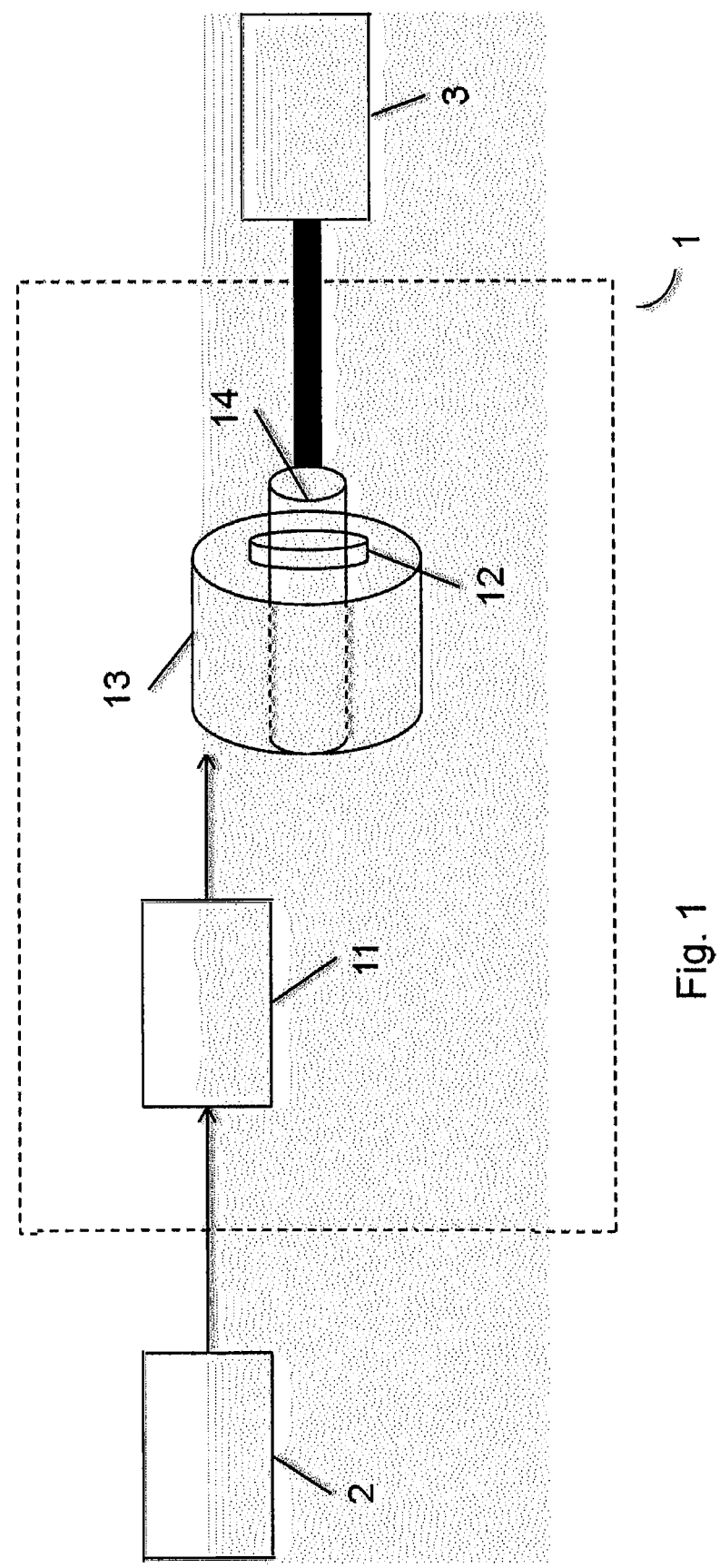
FIG. 1 is a schematic representation of an electric powertrain.

Process for Manufacturing the Improved Fluids Used in the Invention.

The invention makes use of an improved fluid having a boiling point in the range of from 200 to 400° C. and comprising more than 95% isoparaffins and containing less than 100 ppm aromatics by weight, obtainable by the process comprising the step of catalytically hydrogenating a feed comprising more than 95% by weight of a hydrodeoxygenated isomerized hydrocarbon biomass feedstock or a feed comprising more than 95% by weight of a feedstock originating from syngas, at a temperature from 80 to 180° C., at a pressure from 50 to 160 bars, a liquid hourly space velocity of 0.2 to 5 $hr^{-1}$ and an hydrogen treat rate up to 200 $Nm^3$/ton of feed.

According to a first variant, the feed comprises more than 98%, preferably more than 99% of a hydrodeoxygenated isomerized hydrocarbon biomass feedstock, and more preferably consists of a hydrodeoxygenated isomerized hydrocarbon biomass feedstock. According to an embodiment, the biomass is a vegetable oil, an ester thereof or a triglyceride thereof. According to an embodiment, the feed is a NEXBTL feed.

According to second variant, the feed comprises more than 98%, preferably more than 99% of a feedstock originating from syngas. According to an embodiment, the feedstock originates from renewable syngas.

According to an embodiment, the hydrogenation conditions of the process are the following:
Pressure: 80 to 150 bars, and preferably 90 to 120 bars;
Temperature: 120 to 160° C. and preferably 150 to 160° C.;
Liquid hourly space velocity (LHSV): 0.4 to 3, and preferably 0.5 to 0.8 $hr^{-1}$;
Hydrogen treat rate be up to 200 $Nm^3$/ton of feed.

According to an embodiment, a fractionating step is carried out before the hydrogenating step, or after the hydrogenating step or both; according to an embodiment, the process comprises three hydrogenation stages, preferably in three separate reactors.

The invention thus discloses fluids having a boiling point in the range of from 200 to 400° C. and a boiling range below 80° C., said fluid comprising more than 95% by weight isoparaffins and less than 3% of by weight naphthens, a biodegradability at 28 days of at least 60%, as measured according to the OECD 306 standard, a biocarbon content of at least 95% by weight, containing less than 100 ppm by weight aromatics, and preferably comprising carbon expressed as $CH_3$ sat less than 30%.

According to an embodiment, the fluid has a boiling point in the range of from 220 to 340° C. and advantageously more than 240° C. and up to 340° C.

The boiling point can be measured according to well-known methods for the skilled person. As an example, the boiling point can be measured according to ASTM D86 standard.

According to an embodiment, the fluid has a boiling range below 80° C., preferably below 60° C., more preferably between 35 and 50° C. and advantageously between 40 and 50° C.

According to an embodiment, the fluid contains less than 50 ppm by weight aromatics, and preferably less than 20 ppm by weight.

According to an embodiment, the fluid contains less than 1% by weight of naphthens, preferably less than 500 ppm and advantageously less than 50 ppm.

According to an embodiment, the fluid contains less than 5 ppm, even less than 3 ppm and preferably less than 0.5 ppm sulphur.

According to an embodiment, the fluid comprises more than 98% by weight isoparaffins.

According to an embodiment, the fluid has a ratio of iso-paraffins to n-paraffins of at least 20:1.

According to an embodiment, the fluid comprises more than 95% by weight, of molecules with from 14 to 18 carbon atoms as isoparaffins, preferably comprises by weight, from 60 to 95%, more preferably 80 to 98%, of isoparaffins selected from the group consisting of C15 isoparaffins, C16 isoparaffins, C17 isoparaffins, C18 isoparaffins and mixtures of two or more thereof.

According to an embodiment, the fluid comprises:
C15 isoparaffins and C16 isoparaffins in a combined amount of 80 to 98%; or
C16 isoparaffins, C17 isoparaffins and C18 isoparaffins in a combined amount of 80 to 98%; or
C17 isoparaffins and C18 isoparaffins in a combined amount of 80 to 98%.

According to an embodiment, the fluid exhibits one or more, preferably all of the following features:
the fluid comprises carbon expressed as Cquat less than 3%, preferably less than 1% and more preferably about 0%;
the fluid comprises carbon expressed as CH sat less than 20%, preferably less than 18% and more preferably less than 15%;
the fluid comprises carbon expressed as $CH_2$ sat more than 40%, preferably more than 50% and more preferably more than 60%;
the fluid comprises carbon expressed as $CH_3$ sat less than 30%, preferably less than 28% and more preferably less than 25%;
the fluid comprises carbon expressed as $CH_3$ long chain less than 20%, preferably less than 18% and more preferably less than 15%;
the fluid comprises carbon expressed as $CH_3$ short chain less than 15%, preferably less than 10% and more preferably less than 9%.

The amount of isoparaffins, naphthens and/or aromatics can be determined according to any known methods for the skilled person. Among those methods, mention may be made of gas chromatography.

According to an embodiment, the fluid has a biodegradability at 28 days of at least 60%, preferably at least 70%, more preferably at least 75% and advantageously at least 80%, as measured according to the OECD 306 standard.

According to an embodiment, the fluid has a biocarbon content of at least 95% by weight, preferably at least 97%, more preferably at least 98%, and even more preferably about 100%.

The feedstock will first be disclosed, then the hydrogenation step and the associated fractionating step, and finally the improved fluids.

Feedstock.

The feedstock or simply feed may, according a first variant, be a feed which is the result of a process of hydrodeoxygenation followed by isomerization, hereafter "HDO/ISO", as practiced on a biomass.

This HDO/ISO process is applied on biological raw materials, the biomass, selected from the group consisting of vegetable oils, animal fats, fish oils, and mixtures thereof, preferably vegetable oils. Suitable vegetable raw materials include rapeseed oil, canola oil, colza oil, tall oil, sunflower oil, soybean oil, hemp oil, olive oil, linenseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria. Condensation products, esters, or other derivatives obtained from biological raw materials may also be used as starting materials. An especially preferred vegetable raw material is an ester or triglyceride derivative. This material is submitted to an hydrodeoxygenation (HDO) step for decomposing the structure of the biological ester or triglyceride constituent, and for removing oxygen, phosphorus and sulfur (part of) compounds, concurrently hydrogenating the olefinic bonds, followed by isomerization of the product thus obtained, thus branching the hydrocarbon chain and improving the low temperature properties of the thus-obtained feedstock.

In the HDO step, hydrogen gas and the biological constituent are passed to the HDO catalyst bed either in countercurrent or concurrent manner. In the HDO step, the pressure and the temperature range typically between 20 and 150 bar, and between 200 and 500° C., respectively. In the HDO step, known hydrodeoxygenation catalysts may be used. Prior to the HDO step, the biological raw material may optionally be subjected to prehydrogenation under milder conditions to avoid side reactions of the double bonds. After the HDO step, the product is passed to the isomerization step where hydrogen gas and the biological constituent to be hydrogenated, and optionally a n-paraffin mixture, are passed to the isomerization catalyst bed either in concurrent or countercurrent manner. In the isomerization step, the pressure and the temperature range between typically 20 and 150 bar, and between 200 and 500° C., respectively. In the isomerization step, isomerization catalysts known as such may be typically used.

Secondary process steps can also be present (such as intermediate pooling, scavenging traps, and the like).

The product issued from the HDO/ISO steps may for instance be fractionated to give the desired fractions.

Various HDO/ISO processes are disclosed in the literature. WO2014/033762 discloses a process which comprises a pre-hydrogenation step, a hydrodeoxygenation step (HDO) and an isomerization step which operates using the countercurrent flow principle. EP1728844 describes a process for the production of hydrocarbon components from mixtures of a vegetable or animal origin. The process comprises a pretreatment step of the mixture of a vegetable origin for removing contaminants, such as, for example, alkaline metal salts, followed by a hydrodeoxygenation (HDO) step and an isomerization step. EP2084245 describes a process for the production of a hydrocarbon mixture that can be used as diesel fuel or diesel component by the hydrodeoxygenation of a mixture of a biological origin containing fatty acid esters possibly with aliquots of free fatty acids, such as for example vegetable oils such as sunflower oil, rape oil, canola oil, palm oil, or fatty oils contained in the pulp of pine trees (tall oil), followed by hydroisomerization on specific catalysts. EP2368967 discloses such a process and the thus-obtained product.

Company Nesté Oy has developed specific HDO/ISO processes, and is currently marketing products thus obtained, under the tradename NexBTL● (diesel, aviation fuel, naphtha, isoalkane). This NexBTL● is an appropriate feed for use in the present invention. The NEXBTL feed is further described at http://en.wikipedia.org/wiki/NEXBTL and/or at the neste oy website.

The feedstock or simply feed may, according a second variant, be a feed which is the result of a process of conversion of syngas into hydrocarbons suitable for further processing as a feedstock. Syngas typically comprises hydrogen and carbon monoxide and possibly minor other components, like carbon dioxide. A preferred syngas used in the invention is renewable syngas, i.e. syngas from renewable sources (incl. renewable energy sources).

Representative of possible syngas-based feedstocks are the Gas to liquids (GTL) feedstock, the Biomass to liquids (BTL) feedstock, the renewable Methanol to liquid (MTL) feedstock, renewable steam reforming, and waste-to-energy gasification, as well as more recent methods using renewable energy (solar energy, wind energy) to convert carbon dioxide and hydrogen into syngas. An example of this later process is the audi● e-diesel feedstock process. The term syngas also extends to any source of material that can be used in a Fischer Tropsch process, such as methane-rich gases (which may use syngas as intermediate).

The syngas to liquids (STL) process is a refinery process that converts a gaseous hydrocarbons into longer-chain hydrocarbons such as gasoline or diesel fuel. Renewable methane-rich gases are converted into liquid synthetic fuels either via direct conversion or via syngas as an intermediate, for example using the Fischer Tropsch process, Methanol to Gasoline process (MTG) or Syngas to gasoline plus process (STG+). For the Fischer Tropsch process, the effluents produced are Fischer-Tropsch derived.

By "Fischer-Tropsch derived" is meant that a hydrocarbon composition is, or derives from, a synthesis product of a Fischer-Tropsch condensation process. The Fischer-Tropsch reaction converts carbon monoxide and hydrogen (syngas) into longer chain, usually paraffinic hydrocarbons. The overall reaction equations is straightforward (but hide mechanistic complexity):

$n(CO+2H_2)=(—CH_2—)n+nH_2O+heat$, in the presence of an appropriate catalyst and typically at elevated temperatures (e.g., 125 to 300° C., preferably 175 to 250° C.) and/or pressures (e.g., 5 to 100 bars, preferably 12 to 50 bars). Hydrogen:carbon monoxide ratios other than 2:1 may be employed if desired. The carbon monoxide and hydrogen may themselves be derived from organic or inorganic, natural or synthetic sources, typically either from natural gas or from organically derived methane. For examples it can also be derived from biomass or from coal.

The collected hydrocarbon composition containing a continuous iso-paraffinic series as described above may preferably be obtained by hydroisomerisation of a paraffinic wax, preferably followed by dewaxing, such as solvent or catalytic dewaxing. The paraffinic wax is preferably a Fischer-Tropsch derived wax.

Hydrocarbon cuts may be obtained directly from the Fischer-Tropsch reaction, or indirectly for instance by fractionation of Fischer-Tropsch synthesis products or preferably from hydrotreated Fischer-Tropsch synthesis products.

Hydrotreatment preferably involves hydrocracking to adjust the boiling range (see, e.g., GB-B-2077289 and EP-A-0147873) and/or hydroisomerisation, which can improve cold flow properties by increasing the proportion of branched paraffins. EP-A-0583836 describes a two-step hydrotreatment process in which a Fischer-Tropsch synthesis product is firstly subjected to hydroconversion under conditions such that it undergoes substantially no isomerisation or hydrocracking (this hydrogenates the olefinic and oxygen-containing components), and then at least part of the resultant product is hydroconverted under conditions such that hydrocracking and isomerisation occur to yield a substantially paraffinic hydrocarbon fuel. It is possible to adjust the isomerization process so as to obtain mainly isoparaffins with the required carbon distribution. The syngas-based feedstock is isoparaffinic in nature as it contains more than 90% isoparaffins.

Other post-synthesis treatments, such as polymerisation, alkylation, distillation, cracking-decarboxylation, isomerisation and hydroreforming, may be employed to modify the properties of Fischer-Tropsch condensation products, as described for instance in U.S. Pat. Nos. 4,125,566 and 4,478,955. Examples of Fischer-Tropsch processes which for example can be used to prepare the above-described Fischer-Tropsch derived collected hydrocarbon composition are the so-called commercial Slurry Phase Distillate technology of Sasol, the Shell Middle Distillate Synthesis Process and the "AGC-21" Exxon Mobil process. These and other processes are for example described in more details in EP-A-776959, EP-A-668342, U.S. Pat. Nos. 4,943,672, 5,059,299, WO-A-9934917 and WO-A-9920720.

The desired fraction(s) may subsequently be isolated for instance by distillation.

Feedstocks typically contain less than 15 ppm of sulphur, preferably less than 8 ppm and more preferably less than 5 ppm, especially less than 1 ppm, as measured according to EN ISO 20846. Typically the feedstocks will comprise no sulphur as being biosourced products.

Before entering the hydrogenation unit, a pre-fractionation step can take place. Having a more narrow boiling range entering the unit allows having a more narrow boiling range at the outlet. Indeed typical boiling points of pre-fractionated cuts are in the range of from 220 to 330° C. while cuts without a pre-fractionating step typically have a boiling point in the range of from 150° C. to 360° C.

Hydrogenation Step.

The feedstock issued from HDO/ISO or from syngas is then hydrogenated. The feedstock can optionally be pre-fractionated.

Hydrogen that is used in the hydrogenation unit is typically a high purity hydrogen, e.g. with a purity of more than 99%, albeit other grades can be used.

Hydrogenation takes place in one or more reactors. The reactor can comprise one or more catalytic beds. Catalytic beds are usually fixed beds.

Hydrogenation takes place using a catalyst. Typical hydrogenation catalysts include but are not limited to: nickel, platinum, palladium, rhenium, rhodium, nickel tungstate, nickel molybdenum, molybdenum, cobalt molybdenate, nickel molybdenate on silica and/or alumina carriers or zeolites. A preferred catalyst is Ni-based and is supported on an alumina carrier, having a specific surface area varying between 100 and 200 m$^2$/g of catalyst.

The hydrogenation conditions are typically the following:
Pressure: 50 to 160 bars, preferably 80 to 150 bars, and most preferably 90 to 120 bars or 100 to 150 bars;
Temperature: 80 to 180° C., preferably 120 to 160° C. and most preferably 150 to 160° C.;
Liquid hourly space velocity (LHSV): 0.2 to 5 hr$^{-1}$, preferably 0.4 to 3, and most preferably 0.5 to 0.8;
Hydrogen treat rate: adapted to the above conditions, which can be up to 200 Nm$^3$/ton of feed.

The temperature in the reactors can be typically about 150-160° C. and the pressure can be typically about 100 bars while the liquid hourly space velocity can be typically about 0.6 h$^{-1}$ and the treat rate is adapted, depending on the feed quality and the first process parameters.

The hydrogenation process of the invention can be carried out in several stages. There can be two or three stages, preferably three stages, preferably in three separate reactors. The first stage will operate the sulphur trapping, hydrogenation of substantially all unsaturated compounds, and up to about 90% of hydrogenation of aromatics. The flow exiting from the first reactor contains substantially no sulphur. In the second stage the hydrogenation of the aromatics continues, and up to 99% of aromatics are hydrogenated. The third stage is a finishing stage, allowing an aromatic content as low as 100 ppm by weight or even less such as below 50 ppm, more preferably less than 20 ppm, even for high boiling products.

The catalysts can be present in varying or substantially equal amounts in each reactor, e.g. for three reactors according to weight amounts of 0.05-0.5/0.10-0.70/0.25-0.85, preferably 0.07-0.25/0.15-0.35/0.4-0.78 and most preferably 0.10-0.20/0.20-0.32/0.48-0.70.

It is also possible to have one or two hydrogenation reactors instead of three.

It is also possible that the first reactor be made of twin reactors operated alternatively in a swing mode. This may be useful for catalyst charging and discharging: since the first reactor comprises the catalyst that is poisoned first (substantially all the sulphur is trapped in and/or on the catalyst) it should be changed often.

One reactor can be used, in which two, three or more catalytic beds are installed.

It may be necessary to insert quenches on the recycle to cool effluents between the reactors or catalytic beds to control reaction temperatures and consequently hydrothermal equilibrium of the hydrogenation reaction. In a preferred embodiment, there is no such intermediate cooling or quenching.

In case the process makes use of 2 or 3 reactors, the first reactor will act as a sulphur trap. This first reactor will thus trap substantially all the sulphur. The catalyst will thus be saturated very quickly and may be renewed from time to time. When regeneration or rejuvenation is not possible for such saturated catalyst the first reactor is considered as a sacrificial reactor which size and catalyst content both depend on the catalyst renewal frequency.

In an embodiment the resulting product and/or separated gas is/are at least partly recycled to the inlet of the hydrogenation stages. This dilution helps, if this were to be needed, maintaining the exothermicity of the reaction within controlled limits, especially at the first stage. Recycling also allows heat-exchange before the reaction and also a better control of the temperature.

The stream exiting the hydrogenation unit contains the hydrogenated product and hydrogen. Flash separators are used to separate effluents into gas, mainly remaining hydrogen, and liquids, mainly hydrogenated hydrocarbons. The process can be carried out using three flash separators, one of high pressure, one of medium pressure, and one of low pressure, very close to atmospheric pressure.

The hydrogen gas that is collected on top of the flash separators can be recycled to the inlet of the hydrogenation unit or at different levels in the hydrogenation units between the reactors.

Because the final separated product is at about atmospheric pressure, it is possible to feed directly the fractionation stage, which is preferably carried out under vacuum pressure that is at about between 10 to 50 mbars, preferably about 30 mbars.

The fractionation stage can be operated such that various hydrocarbon fluids can be withdrawn simultaneously from the fractionation column, and the boiling range of which can be predetermined.

Therefore, fractionation can take place before hydrogenation, after hydrogenation, or both.

The hydrogenation reactors, the separators and the fractionation unit can thus be connected directly, without having to use intermediate tanks. By adapting the feed, especially the initial and final boiling points of the feed, it is possible to produce directly, without intermediate storage tanks, the final products with the desired initial and final boiling points. Moreover, this integration of hydrogenation and fractionation allows an optimized thermal integration with reduced number of equipment and energy savings.

Fluids Used in the Invention.

The fluids used in the invention, hereafter referred to simply as "the improved fluids" possess outstanding properties, molecular weight, vapour pressure, viscosity, defined evaporation conditions for systems where drying is important, and defined surface tension.

The improved fluids are primarily isoparaffinic and contain more than 95% isoparaffins, preferably more than 98%.

The improved fluids typically contain less than 3% by weight of naphthens, preferably less than 1% and advantageously less than 500 ppm and even less than 50 ppm by weight.

Typically, the improved fluids comprise carbon atoms number from 6 to 30, preferably 8 to 24 and most preferably from 9 to 20 carbon atoms. The fluids especially comprise a majority, i.e. more than 90% by weight, of molecules with from 14 to 18 carbon atoms as isoparaffins. Preferred improved fluids are those comprising by weight, from 60 to 95%, preferably 80 to 98%, of isoparaffins selected from the group consisting of C15 isoparaffins, C16 isoparaffins, C17 isoparaffins, C18 isoparaffins and mixtures of two or more thereof.

Preferred improved fluids comprise:
C15 isoparaffins and C16 isoparaffins in a combined amount of 80 to 98%; or
C16 isoparaffins, C17 isoparaffins and C18 isoparaffins in a combined amount of 80 to 98%; or
C17 isoparaffins and C18 isoparaffins in a combined amount of 80 to 98%.

Examples of preferred improved fluids are those comprising:
from 30 to 70% of C15 isoparaffins and from 30 to 70% C16 isoparaffins, preferably from 40 to 60% of C15 isoparaffins and from 35 to 55% C16 isoparaffins;
from 5 to 25% of C15 isoparaffins, from 30 to 70% C16 isoparaffins and from 10 to 40% of C17 isoparaffins, preferably from 8 to 15% of 015 isoparaffins, from 40 to 60% C16 isoparaffins and from 15 to 25% of C17 isoparaffins;
from 5 to 30% of C17 isoparaffins and from 70 to 95% C18 isoparaffins, preferably from 10 to 25% of C17 isoparaffins and from 70 to 90% C18 isoparaffins.

The improved fluids exhibit a specific branching distribution.

Branching rates of isoparaffins as well as carbon distribution is determined using the NMR method (as well as GC-MS) and determination of each type of carbon (with no hydrogen, with one, two or three hydrogens). C quat sat represents the saturated quaternary carbon, CH sat represents the saturated carbon with one hydrogen, $CH_2$ sat represents the saturated carbon with two hydrogens, $CH_3$ sat represents the saturated carbon with three hydrogens, $CH_3$ long chain and $CH_3$ short chain represent the $CH_3$ group on a long chain and a short chain, respectively where the short chain is one methyl group only and a long chain is a chain having at least two carbons. The sum of $CH_3$ long chain and $CH_3$ short chain is $CH_3$ sat.

The improved fluids typically comprise carbon expressed as Cquat less than 3%, preferably less than 1% and more preferably about 0%.

The improved fluids typically comprise carbon expressed as CH sat less than 20%, preferably less than 18% and more preferably less than 15%.

The improved fluids typically comprise carbon expressed as $CH_2$ sat more than 40%, preferably more than 50% and more preferably more than 60%.

The improved fluids typically comprise carbon expressed as $CH_3$ sat less than 30%, preferably less than 28% and more preferably less than 25%.

The improved fluids typically comprise carbon expressed as $CH_3$ long chain less than 20%, preferably less than 18% and more preferably less than 15%.

The improved fluids typically comprise carbon expressed as $CH_3$ short chain less than 15%, preferably less than 10% and more preferably less than 9%.

The improved fluids have a boiling point in the range of from 200 to 400° C. and also exhibit an enhanced safety, due to the very low aromatics content.

The improved fluids typically contain less than 100 ppm, more preferably less than 50 ppm, advantageously less than 20 ppm aromatics (measured using a UV method). This makes them suitable for use in electric vehicle fluids. This is especially useful for high temperature boiling products, typically products having a boiling point in the range 300-400° C., preferably 320-380° C.

The boiling range of the improved fluids is preferably not more than 80° C., preferably not more than 70° C., more preferably not more than 60° C., even more preferably between 35 and 50° C. and advantageously between 40 and 50° C.

The improved fluids also have an extremely low sulphur content, typically less than 5 ppm, even less than 3 ppm and preferably less than 0.5 ppm, at a level too low to be detected by the usual low-sulphur analyzers.

The Initial Boiling Point (IBP) to Final Boiling Point (FBP) range is selected according to the particular use and composition. An Initial Boiling Point of more than 250° C. allows classification as free of VOC (Volatile Organic Compounds) according to the directive 2004/42/CE.

Biodegradation of an organic chemical refers to the reduction in complexity of the chemical through metabolic activity of microorganisms. Under aerobic conditions, microorganisms convert organic substances into carbon dioxide, water and biomass. OECD 306 method, is available for assessing biodegradability of individual substances in seawater. OECD Method 306 can be carried out as either a shake flask or Closed Bottle method and the only microorganisms added are those microorganisms in the test seawater to which the test substance is added. In order to assess the biotic degradation in seawater, a biodegradability test was performed which allows the biodegradability to be measured in seawater. The biodegradability was determined in the Closed Bottle test performed according to the OECD 306 Test Guidelines. The biodegradability of the improved fluids is measured according to the OECD Method 306.

The OECD Method 306 is the following:

The closed bottle method consists on dissolution of a pre-determined amount of the test substance in the test medium in a concentration of usually 2-10 mg/l, with one or more concentrations being optionally used. The solution is kept in a filled closed bottle in the dark in a constant temperature bath or enclosure controlled within a range of 15-20° C. The degradation is followed by oxygen analyses over a 28-day period. Twenty-four bottles are used (8 for test substance, 8 for reference compound and 8 for sweater plus nutriment). All analyses are performed on duplicate bottles. Four determinations of dissolved oxygen, at least, are performed (day 0, 5, 15 and 28) using a chemical or electrochemical method.

Results are thus expressed in % degradability at 28 days. The improved fluids have a biodegradability at 28 days of at least 60%, as measured according to the OECD 306 standard, preferably at least 70% by weight, more preferably at least 75% and advantageously at least 80%.

The invention uses the products of natural origin like starting products. The carbon of a biomaterial comes from the photosynthesis of the plants and thus of atmospheric $CO_2$. The degradation (by degradation, one will understand also combustion/incineration at the end of the lifetime) of these CO2 materials thus does not contribute to the warming since there is no increase in the carbon emitted in the atmosphere. The assessment $CO_2$ of the biomaterials is thus definitely better and contributes to reduce the print carbon of the products obtained (only energy for manufacture is to be taken into account). On the contrary, a fossil material of origin being also degraded out of $CO_2$ will contribute to the increase in the $CO_2$ rate and thus to climate warming. The improved fluids according to the invention will thus have a print carbon which will be better than that of compounds obtained starting from a fossil source.

The invention thus improves also the ecological assessment during the manufacture of the improved fluids. The term of "bio-carbon" indicates that carbon is of natural origin and comes from a biomaterial, as indicated hereafter. The content of biocarbon and the content of biomaterial are expressions indicating the same value.

A renewable material of origin or biomaterial is an organic material in which carbon comes from $CO_2$ fixed recently (on a human scale) by photosynthesis starting from the atmosphere. On ground, this $CO_2$ is collected or fixed by the plants. At sea, $CO_2$ is collected or fixed by microscopic bacteria or plants or algae carrying out a photosynthesis. A biomaterial (carbon natural origin 100%) presents an isotopic ratio $^{14}C/^{12}C$ higher than $10^{-12}$, typically about $1.2 \times 10^{-12}$, while a fossil material has a null ratio. Indeed, the isotope $^{14}C$ is formed in the atmosphere and is then integrated by photosynthesis, according to a scale of time of a few tens of years at the maximum. The half-life of $^{14}C$ is 5730 years. Thus the materials resulting from photosynthesis, namely the plants in a general way, have necessarily a maximum content of isotope $^{14}C$.

The determination of the content of biomaterial or content of biocarbon is given pursuant to standards ASTM D 6866-12, method B (ASTM D 6866-06) and ASTM D 7026 (ASTM D 7026-04). Standard ASTM D 6866 concerns "Determining the Biobased Content of Natural Range Materials Using Radiocarbon and Isotope Ratio Mass Spectrometry Analysis", while standard ASTM D 7026 concerns "Sampling and Reporting of Results for Determination of Biobased Content of Materials via Carbon Isotope Analysis". The second standard mentions the first in its first paragraph.

The first standard describes a test of measurement of the ratio $^{14}C/^{12}C$ of a sample and compares it with the ratio $^{14}C/^{12}C$ of a sample renewable reference of origin 100%, to give a relative percentage of C of origin renewable in the sample. The standard is based on the same concepts that the dating with $^{14}C$, but without making application of the equations of dating. The ratio thus calculated is indicated as the "pMC" (percent Modem Carbon). If the material to be analyzed is a mixture of biomaterial and fossil material (without radioactive isotope), then the value of pMC obtained is directly correlated with the quantity of biomaterial present in the sample. The value of reference used for the dating to $^{14}C$ is a value dating from the years 1950. This year was selected because of the existence of nuclear tests in the atmosphere which introduced great quantities of isotopes into the atmosphere after this date. The reference 1950 corresponds to a value pMC of 100. Taking into account the thermonuclear tests, the current value to be retained is approximately 107.5 (what corresponds to a factor of correction of 0.93). The signature into radioactive carbon of a current plant is thus of 107.5. A signature of 54 pMC and 99 pMC thus correspond to a quantity of biomaterial in the sample of 50% and 93%, respectively.

The compounds according to the invention come at least partly from biomaterial and thus present a content of biomaterial from at least 95%. This content is advantageously even higher, in particular more than 98%, more preferably more than 99% and advantageously about 100%. The compounds according to the invention can thus be bio-carbon of 100% biosourced or on the contrary to result from a mixture with a fossil origin. According to an embodiment, the isotopic ratio $^{14}C/^{12}C$ is between 1.15 and $1.2 \times 10^{-12}$.

All percentages and ppm are by weight unless indicated to the contrary. Singular and plural are used interchangeably to designate the fluid(s).

Lubricating Composition.

When used as lubricant, the improved fluids are in a lubricating composition, which can comprise from 1 to 100% by weight relative to the total weight of the composition. In a preferred embodiment, the lubricating composition comprises 50 to 99%, preferably 70 to 99%, preferably 80 to 99% by weight relative to the total weight of the composition; this embodiment may correspond to the use of the fluid of the invention as a majority or sole base oil in the lubricating composition.

In another embodiment, the lubricating composition can comprise from 1 to 40%, preferably from 5 to 30%, more preferably from 10 to 30% by weight relative to the total weight of the lubricating composition; this embodiment may correspond to the use of the fluid of the invention as an additional base oil (or co-base oil) in the lubricating composition. The main base oil is standard and can be of mineral or renewable origin, especially chosen among group I to V base oils according to API classification.

In another embodiment the improved fluids may be used in combination with other lubricating compositions.

The lubricating composition according to the present invention may further comprise an additive selected from selected friction modifiers, detergents, antiwear additives, extreme pressure additives, viscosity improvers index, dispersants, antioxidants the pour point improvers, antifoams, thickeners and mixtures thereof.

Anti-wear additives and extreme pressure additives protect the formation by rubbing surfaces of a protective film adsorbed on these surfaces.

There are a wide variety of anti-wear additives. Preferably the anti-wear additives are selected from phospho-sulfurized additives such as metal alkylthiophosphates, especially zinc alkylthiophosphates, more specifically the zinc dialkyl dithiophosphates or ZnDTP. Preferred compounds are of the formula Zn ((SP (S)(OR2)(OR3))2, wherein R2 and R3, identical or different, independently represent an alkyl group, preferably an alkyl group having 1 to 18 carbon atoms.

Phosphates amines are also anti-wear additives that can be employed in the lubricating composition according to the invention. However, phosphorus provided by these additives can act as poison for automobile catalytic systems because these additives are generators of ashes. One can minimize these effects by partially substituting the amine phosphate by additives bringing no phosphorus, such as, for example, polysulfides, including sulfurized olefins.

Advantageously, the lubricating composition according to the invention may comprise from 0.01 to 6% by weight, preferably from 0.05 to 4% by mass, more preferably from 0.1 to 2% by mass relative to the mass total lubricant composition, of anti-wear and extreme pressure additives additives.

Advantageously, the lubricating composition according to the invention may comprise at least one friction modifier additive. The friction modifier additive can be selected from a compound supplying metal elements and a free compound of ashes. Among the compounds providing the metallic elements some include transition metal complexes such as Mo, Sb, Sn, Fe, Cu, Zn whose ligands can be hydrocarbon compounds comprising oxygen, nitrogen, sulfur or phosphorus. The ashless friction modifier additives are usually organic in origin and may be selected from monoesters of fatty acids and of polyols, alkoxylated amines, alkoxylated fatty amines, fatty epoxides, borated fatty epoxides; fatty amines or fatty acid glycerol esters. According to the invention, the fatty compounds comprise at least one hydrocarbon group having from 10 to 24 carbon atoms.

Advantageously, the lubricating composition of the invention may comprise from 0.01 to 2% by weight or 0.01 to 5% by weight, preferably from 0.1 to 1.5% by mass or 0.1 to 2% by weight based on the total weight of the lubricating composition, of a friction modifier additive.

Advantageously, the lubricating composition according to the invention may comprise at least one antioxidant additive.

The antioxidant additive generally used to delay the degradation of the lubricating composition in service. This degradation may in particular result in the formation of deposits, the presence of sludge, or a viscosity increase of the lubricating composition.

The additives including antioxidants act as free radical inhibitors or destructive hydroperoxides. Among the additives commonly used antioxidants include phenolic antioxidants additives type additives amine type antioxidants, antioxidants additives phosphorosulphur. Some of these antioxidant additives, for example antioxidants phosphorosulphur additives may be ash generators. Additives phenolic antioxidants may be ashless or be in the form of neutral or basic metal salts. The antioxidant additives may be chosen from sterically hindered phenols, sterically hindered phenol esters and hindered phenols comprising a thioether bridge, the diphenylamines, the substituted diphenylamines at least one alkyl group C1-C12, N, N'-dialkyle-aryl diamines and mixtures thereof.

Preferably according to the invention, sterically hindered phenols are selected from compounds comprising a phenol group having at least one vicinal carbon atoms bearing the alcohol function is substituted by at least one C1-C10 alkyl group, preferably an alkyl group C1-C6, preferably a C4 alkyl group, preferably tert-butyl group.

Amine compounds are another class of antioxidant additives that can be used, optionally in combination with additives phenolic antioxidants. Examples of amino compounds are aromatic amines, for example, aromatic amines of the formula NR4R5R6 wherein R4 represents an aliphatic group or an aromatic group, optionally substituted, R5 represents an aromatic group optionally substituted, R6 represents a hydrogen atom, an alkyl group, an aryl group or a group of formula R7S(O)zR8 in which R7 represents an alkylene group or an alkenylene group, R8 represents an alkyl group, an alkenyl group or an aryl group and z represents 0, 1 or 2.

Sulfurized alkyl phenols or their alkali and alkaline earth metal salts may also be used as antioxidant additives.

Another antioxidant additives class is that of copper compounds, for examples thio- or dithio-phosphates of copper, copper salts and of carboxylic acids, dithiocarbamates, sulphonates, phenates, copper acetylacetonates. Copper salts I and II, the acid salts or succinic anhydride can also be used.

The lubricating composition according to the invention can contain all types of antioxidant additives known to the skilled person.

Advantageously, the lubricating composition comprises at least one antioxidant ashless additive.

Also advantageously, the lubricating composition according to the invention comprises from 0.5 to 2% by weight relative to the total weight of the composition, of at least one antioxidant additive.

The lubricating composition according to the invention may further comprise at least one detergent additive.

The detergent additives generally reduce the formation of deposits on the surface of metal parts by dissolution of secondary oxidation and combustion products.

The detergent additives used in the lubricating composition according to the invention are generally known to those skilled in the art. The detergent additives can be anionic compounds comprising a lipophilic long hydrocarbon chain and a hydrophilic head. The associated cation may be a metal cation of an alkali metal or alkaline earth metal.

The detergent additives are preferably selected from alkali metal salts or alkaline earth metal salts of carboxylic acids, sulfonates, salicylates, naphthenates, phenates and the salts. Alkali and alkaline earth metals are preferably calcium, magnesium, sodium or barium.

These metal salts generally include the metal in stoichiometric amount or in excess, that is an amount higher than the stoichiometric amount. The additives are then overbased detergents; excess metal providing the character to the overbased detergent additive being usually in the form of an insoluble metal salt in the oil, for example a carbonate, hydroxide, oxalate, acetate, glutamate, preferably a carbonate.

Advantageously, the lubricating composition of the invention may comprise from 2 to 4% by weight of detergent additive based on the total weight of the lubricating composition.

The lubricating composition of the invention may also comprise at least a pour point depressant additive, albeit this is generally not needed given the pour point of the improved fluids.

By slowing down the formation of wax crystals, pour point depressant additives generally improve the temperature behavior of the lubricant composition according to the invention.

As examples of additives pour point depressants include alkyl polymethacrylates, polyacrylates, polyarylamides, the polyalkylphenols, the polyalkylnaphthalenes, alkylated polystyrenes.

Advantageously, the lubricating composition according to the invention may also comprise at least one dispersing agent.

The dispersing agent may be selected from Mannich bases, succinimides and derivatives thereof.

Also advantageously, the lubricating composition according to the invention may comprise from 0.2 to 10% by weight of dispersing agent relative to the total weight of the lubricating composition.

The lubricating composition of the present invention may further comprise at least one additive improving viscosity index. Examples of additives which improve the viscosity index, there may be mentioned ester polymers, homopolymers or copolymers, hydrogenated or non-hydrogenated, styrene, butadiene and isoprene, polyacrylates, polymethacrylates (PMA) or the olefin copolymers, particularly ethylene/propylene copolymers.

The lubricating composition of the invention can be in various forms. The lubricating composition according to the invention may especially not be an emulsion and is more preferably an anhydrous composition.

Electric Motor and Parts of Electric Vehicle

FIG. 1 shows a schematic representation of the electric motorization in an electric or a hybrid vehicle.

The electric motor (1) of electric vehicles and hybrid vehicles comprises a power electronics (11), connected to a stator (13) and a rotor (14). The rotating speed of the rotor is very high and this implies to add a reducer (3) between the rotor of the electric motor (1) and the wheels of the car.

The stator comprises different windings, in particular copper windings, which are alternatively supplied with electric current. This induces a rotating magnetic field. The rotor comprises itself windings, permanent magnets or the like, thus the rotating magnetic field leads to the rotation of the rotor.

The power electronics, the stator and rotor of an electric motor are typically of complex surfaces and structures all of which generating a significant amount of heat during operation. This is why the improved fluid as described hereabove is specifically used for cooling the power electronics and/or the rotor and/or the stator of the electric motor.

In a preferred embodiment the invention relates to the use of the improved fluid as defined here above for cooling the power electronics, the rotor and the stator of the electric motor.

Bearings (12) are also provided between the rotor and the stator and allow maintaining the rotation axis. These bearings are subjected to high frictional shear and rise wear issues and short lifetime problems. This is why the improved fluid as described hereabove is specifically used for lubricating bearings of the electric motor.

In a preferred embodiment the invention relates to the use of a fluid as defined hereabove for lubricating the bearings located between the rotor and the stator of the electric motor of a vehicle.

The reducer (3) aims at reducing the rotation speed at the electric motor output and thus to adapt the rotating speed transmitted to the wheels, whereby the vehicle speed can be adjusted. The reducer is submitted to high frictional constraints and requires suitable lubrication so as to avoid damaging. This is why the improved fluid as described here above is specifically used for lubricating the transmission, especially the reducer of an electric vehicle.

The invention also relates to the use of an improved fluid as defined here above for cooling the power electronics and/or the rotor and/or the stator and for lubricating the reducer and/or the bearings located between the rotor and the stator of the motor of an electric vehicle The electric motor is supplied by an electric battery (2). The Li-ion batteries are the most common in the domain of electric vehicles. The development of batteries being more and more powerful and with a size lesser and lesser creates issues with the cooling of the batteries. Indeed as the temperature exceeds approximately 50 to 55° C., an important risk of ignition or even of explosion appears. On the contrary, when the temperature of these batteries falls below approximately 20 to 25° C., there is a risk of unloading the battery prematurely. There is thus a need to maintain the temperature of the battery at an acceptable temperature level.

The invention also relates to the use of the improved fluid as defined here above for cooling the battery of a vehicle and/or the electric motor of a vehicle.

The vehicle can be purely electric or can be hybrid and the invention equally applies to both.

The invention also relates to the method for cooling the electric motor of a vehicle comprising at least a step of contacting a mechanical part of the motor with a fluid as defined here above.

The invention also relates to the method for cooling the power electronics and/or the rotor and/or the stator of a vehicle comprising at least a step of contacting the power electronics and/or the rotor and/or the stator with an improved fluid as defined here above.

The invention also relates to the method for lubricating the electric motor of a vehicle comprising at least a step of contacting a mechanical part of the motor with a fluid as defined here above.

The invention also relates to the method for lubricating the bearings located between the rotor and the stator of a vehicle comprising at least a step of contacting a mechanical part of said bearings with an improved fluid as defined here above.

The invention also relates to the method for cooling and lubricating the electric motor of a vehicle comprising at least a step of contacting a mechanical part of the motor with a fluid as defined here above.

The invention also relates to the method for cooling the electric motor and lubricating the transmission of a vehicle comprising at least a step of contacting a mechanical part of the motor and of the transmission with a fluid as defined here above.

The invention also relates to the method for cooling the power electronics and/or the stator and/or the rotor and for lubricating the reducer and/or the bearings located between the rotor and the stator of the electric motor of a vehicle comprising at least a step of contacting a part of the power electronics and/or the stator and/or the rotor and of the reducer and/or the bearings with an improved fluid as defined here above.

The invention also relates to the method for cooling the battery comprising at least a step of contacting the battery with a fluid as defined here above.

The invention also relates to the method for cooling the battery and the electric motor comprising at least a step of contacting the battery and a mechanical part of the motor with a fluid as defined here above.

The following example illustrates the invention without limiting it.

EXAMPLES

Example 1

A feedstock being a NEXBTL feedstock (isoalkane) is used in the process of the invention. The following conditions for hydrogenation are used:

The temperature in the reactors is about 150-160° C.; the pressure is about 100 bars and the liquid hourly space velocity is 0.6 $h^{-1}$; the treat rate is adapted. The catalyst used is nickel on alumina.

Fractionating is carried out to provide 3 fluids to be used in the invention.

The resulting products have been obtained, with the following properties.

The following standards have been used to determine the following properties:

| | |
|---|---|
| Flash point | EN ISO 2719 |
| Pour point | EN ISO 3016 |
| Density at 15° C. | EN ISO 1185 |
| Viscosity at 40° C. | EN ISO 3104 |
| Aniline point | EN ISO 2977 |
| HFRR | EN ISO 12156 |
| EP tester | Recommended Practice by API" - API RP 13 |
| Thermal conductivity[1] | Internal Flash method |
| Specific heat[2] | Method by calorimetry |

1. A specific apparatus is used, comprising two tubes of aluminium, one inner and one outer. The fluid to be measured is placed in the annular space between the two tubes. An energy pulse (dirac type) is applied on the inner tube and the temperature is measured on the outer tube, whereby a thermogram is obtained.

Knowing the thermal diffusivity, density and specific heat of two layers of the two tubes of aluminium as a function of temperature, and knowing the density and specific heat of the fluid to be analysed, one can deduce the thermal conductivity Lambda of the fluid as a function of temperature.

Calibration of the Apparatus.

The apparatus is first calibrated with a reference sample, SERIOLA 1510 (heat transfer medium) at different temperatures. The different thermal properties were measured separately before.

Sample Preparation.

The sample is mixed and introduced (using syringe) into the annular space between the two tubes. The loaded apparatus is then placed in a chamber regulated in temperature.

Measurement Protocol.

For each temperature measurement, the following procedure is followed. The sample is stabilized at a given temperature. Then light flashes are applied on the inner face of the inner tube and the rise in temperature of the outer face of the outer tube is recorded over time.

Based on average values obtained with at least 3 measures at each given temperature, the thermal conductivity is calculated.

2. The specific heat is measured using a DSC calorimeter (DSC NETZSCH 204 Phoenix), which is compliant with standards ISO 113587, ASTM E1269, ASTM E968, ASTM E793, ASTM D3895, ASTM D3417, ASTM D3418, DIN 51004, DIN 51007 and DIN 53765.

| Characteristic | Ex. 1 | Ex. 2 | Ex. 3 |
|---|---|---|---|
| Aromatic content (ppm) | <20 | <20 | <20 |
| Sulfur content (ppm) | 0.1 | 0.1 | 0.11 |
| % isoparaffins (w/w) | 98.9 | 95.1 | 96.2 |
| % n-paraffins (w/w) | 1.1 | 4.9 | 3.8 |
| % naphthenic (w/w) | 0 | 0 | 0 |
| C15 (iso) | 48.35 | 11.45 | 0 |
| C16 (iso) | 42.80 | 47.89 | 1.58 |
| C17 (iso) | 2.52 | 18.57 | 14.17 |
| C18 (iso) | 0.38 | 17.07 | 79.69 |
| C quat sat | 0 | 0 | 0 |
| CH sat | 12.1 | 10.9 | 10.2 |
| $CH_2$ sat | 64.9 | 67.8 | 70.7 |
| $CH_3$ sat | 22.9 | 21.2 | 19.1 |
| $CH_3$ long chain | 14.2 | 13.3 | 12 |
| $CH_3$ short chain | 8.7 | 8 | 7.1 |
| Biocarbon content (%) | 97 | 97 | 98 |
| Initial Boiling Point (° C.) | 247.0 | 259.5 | 293.6 |
| 5% point (° C.) | 255.7 | 270.2 | 296.7 |
| 50% point (° C.) | 258.9 | 274.5 | 298.5 |
| 95% point (° C.) | 266.8 | 286.4 | 305.3 |
| Dry point (° C.) | 269.0 | 287.5 | 324.1 |
| OECD biodegradability (28 days) (%) | 80 | 83 | 83 |
| Flash point (° C.) | 115 | 125 | 149.5 |
| Density at 15° C. (kg/m3) | 776.4 | 780.3 | 787.2 |
| Viscosity at 40° C. (mm$^2$/s) | 2.495 | 2.944 | 3.870 |
| Aniline point (° C.) | 93.2 | 95.7 | 99.5 |
| Friction coefficient (HFRR, mm) | 0.248 | 0.232 | 0.213 |
| Friction coefficient (EP tester, mm) | 0.16 | 0.15 | 0.14 |
| Thermal conductivity Lambda (at ° C. in W/(m · K)) | 28/0.130 73/0.125 128/0.124 | 27/0.135 73/0.128 127/0.126 | 23/0.138 88/0.137 158/0.127 |
| Specific heat (at ° C. in J/ (kg · K)) | 30.3/2154 74.8/2336 129.2/2540 | 31.3/2202 74.8/2324 129.2/2503 | 31.3/2185 89.7/2377 158.9/2695 |

The fluids also are colorless, odorless, have a purity according to the European Pharmacopoeia suitable for food grade application, and are solvent class A according to CEN/TS 16766.

These results show that the improved fluid described in the invention have improved lubricity properties.

The thermal conductivity values are indicative of a conductivity that is superior to the one of standard mineral oils, at the same viscosity (by up to 7%), the heat transfer rate is improved. The specific heat is superior to the one of standard mineral oils (by up to 11%).

Example 2

An experiment carried out to measure the heat transfer coefficient of a fluid as used in the present invention (Ex.3) and comparative compositions (Ex.4) is described below. Said comparative compositions are poly-alpha-olefin of fossil origin (PAO 1 and PAO 2), useful as cooling fluid in electric and hybrid vehicles.

The heat transfer coefficient of a fluid measures thermal properties of said fluid. A fluid with a high heat transfer coefficient has a better cooling efficiency.

Measurement Protocol.

The experiment consists in directing a fluid jet through a spray nozzle perpendicularly onto a metal plate heated by induction. A thermal camera, placed above the heated plate, records the temperature profile during spraying of the fluid. The measure of temperature variation on the plate gives access to the heat transfer coefficient of the composition.

Some parameters of the experiment can be changed, in particular the temperature of the plate (by varying the electric current), the size of the spray nozzle and the pressure of the oil jet. The temperature is measured at several distances of the impact point of the oil jet on the metal plate and in several directions. Conditions of the experiment are described in the table below.

| Characteristics | Unit | Comparative Ex. 4 | Comparative Ex. 5 |
|---|---|---|---|
| Temperature | ° C. | 80 | 80 |
| Pressure | bar | 6 | 10 |
| Electric current | kW | 40 | 40 |
| Radius | m | 0-0.016 | 0-0.016 |

The temperature value at a given distance of the impact point is the average of the temperatures measured at several points of a circle centered on the impact point, at a given radius.

Figure 2:
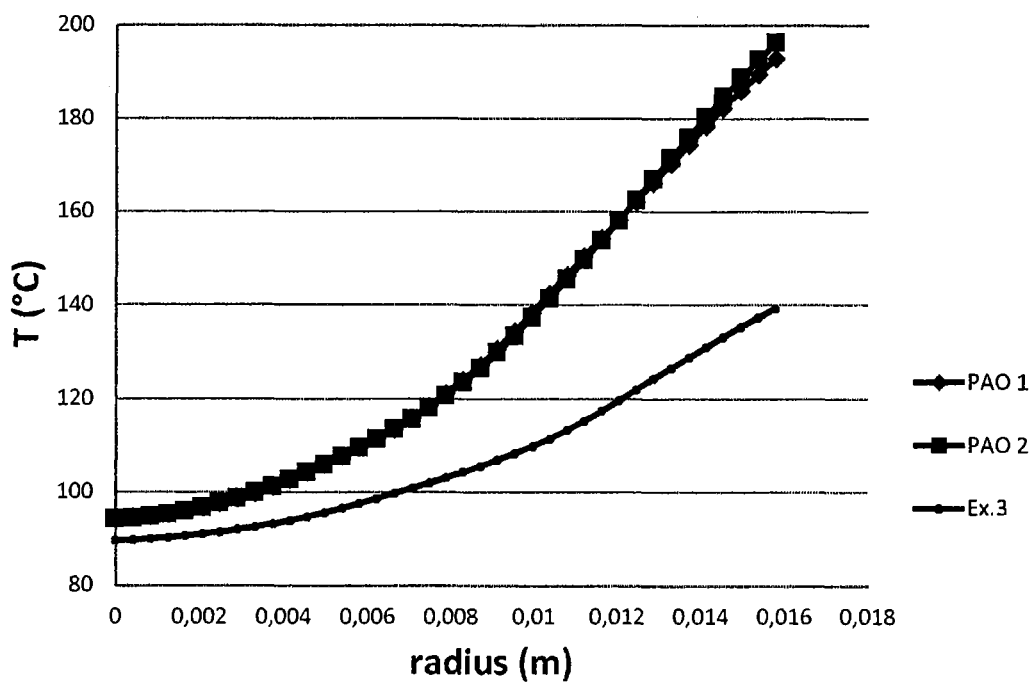
FIG. 2 is a graph representing the results of a test measuring the heat transfer coefficient of fluids, at an electric current of 40 kW and an oil jet pressure of 6 bar.
Figure 3:
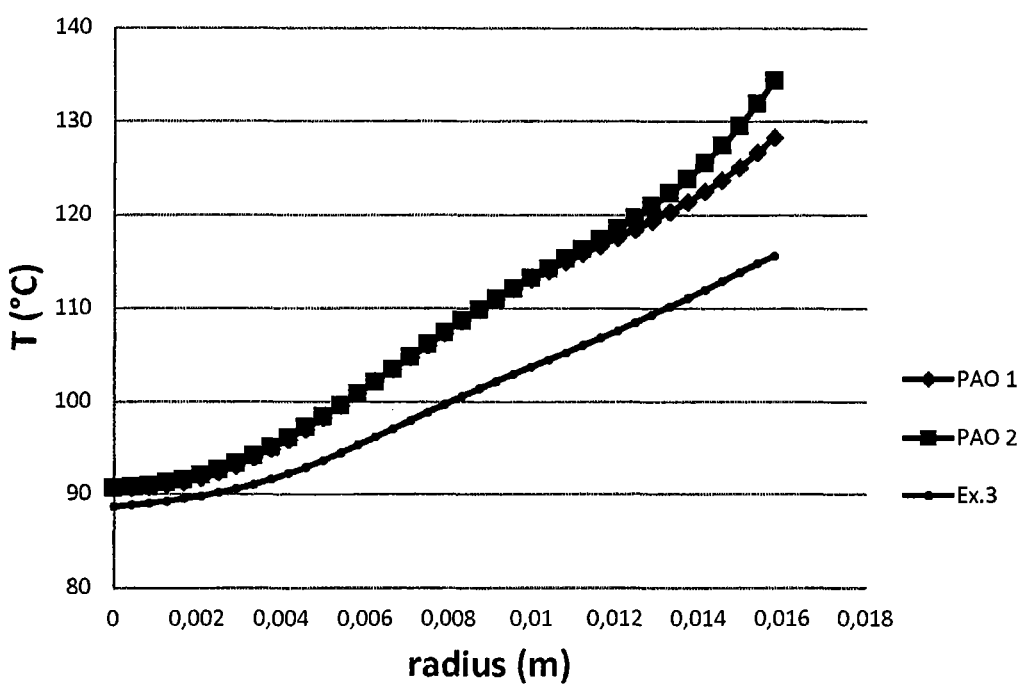
FIG. 3 is a graph representing the results of a test measuring the heat transfer coefficient of fluids, at an electric current of 40 kW and an oil jet pressure of 10 bar.

Results are represented at FIGS. 2 and 3.

On FIGS. 2 and 3, the Y axis represents the temperature measured on the metal plate; the X axis represents the radius, i.e. the distances between the point where the temperature is measured and the impact point of the oil jet on the metal plate.

FIG. 2 represents the results obtained at an electric current of 40 kW and an oil jet pressure of 6 bar of with the fluid of Ex.3 (-•-) compared to the results obtained with a poly-alpha-olefin (-♦-; -■-);

FIG. 3. represents the results obtained at an electric current of 40 kW and an oil jet pressure of 10 bar of with the fluid of Ex.3 (-•-) compared to the results obtained with a poly-alpha-olefin (-♦-; -■-);

Both Figures show that the temperature measured on the metal plate at a radius greater than 0.01 m is much lower (respectively 10° C. and 20° C. lower) when the fluid of Ex.3 useful for the invention is sprayed (-•-) as compared to the temperature measured at the same radius on the metal plate when a comparative compositions of poly-alpha-olefin are sprayed (-♦-; -■-).

This means that the fluids useful for the invention provide more efficient cooling of the heated metal plate as compared to the comparative compositions of poly-alpha-olefin.

As a consequence, said fluids are useful for cooling the motor of an electric or hybrid vehicle.

The invention claimed is:

1. Method for cooling components of an electric or a hybrid vehicle, said method comprising:
   using a fluid having a boiling point in the range of from 200° C. to 400° C. and a boiling range below 80° C., said fluid comprising more than 95% by weight isoparaffins and less than 3% by weight of naphthens, a biocarbon content of at least 95% by weight, containing less than 100 ppm by weight aromatics;
   wherein said components of the electric or hybrid vehicle comprise at least one of a motor, power electronics, a rotor of the motor, a stator of the motor, a battery, or a combination thereof.

2. Method for lubricating components of an electric or a hybrid vehicle, said method comprising:
   using a fluid having a boiling point in the range of from 200° C. to 400° C. and a boiling range below 80° C., said fluid comprising more than 95% by weight isoparaffins and less than 3% by weight of naphthens, a biocarbon content of at least 95% by weight, containing less than 100 ppm by weight aromatics;
   wherein said components of the electric or hybrid vehicle comprise at least one of a motor, bearings between a rotor and a stator of the motor, a reducer of the motor, a transmission, or a combination thereof.

3. Method of claim 1, comprising:
using the fluid in the electric vehicle.

4. Method of claim 2, comprising:
using the fluid in the electric vehicle.

5. Method of claim 1, comprising:
using the fluid for cooling the battery.

6. Method of claim 1, comprising:
using the fluid for cooling and lubricating the motor.

7. Method of claim 1, comprising:
using the fluid for cooling the motor and for lubricating the transmission.

8. Method of claim 1, wherein the fluid has a boiling point in the range of from 220° C. to 340° C.

9. Method of claim 1, wherein the boiling range of the fluid is 240° C.-275° C. or 250° C.-295° C. or 285° C.-335° C.

10. Method of claim 1, wherein the fluid contains less than 50 ppm by weight aromatics.

11. Method of claim 1, wherein the fluid contains less than 1% by weight of naphthens by weight.

12. Method of claim 1, wherein the fluid contains less than 5 ppm sulphur.

13. Method of claim 1, wherein the fluid has a biodegradability at 28 days of at least 60%, as measured according to the OECD 306 standard.

14. Method of claim 1, wherein the fluid contains less than 50 ppm by weight aromatics and less than 500 ppm by weight of naphthens.

15. Method of claim 1, wherein the fluid contains less than 20 ppm by weight aromatics and less than 50 ppm by weight of naphthens.

* * * * *